(12) United States Patent  
Pereira et al.

(10) Patent No.: US 9,256,395 B1  
(45) Date of Patent: Feb. 9, 2016

(54) PREVIEWING AUDIO DATA ASSOCIATED WITH AN ITEM

(71) Applicant: Brilliance Publishing, Inc., Grand Haven, MI (US)

(72) Inventors: Mark S. Pereira, Grand Haven, MI (US); Rick M. Murak, Muskegon, MI (US)

(73) Assignee: Brilliance Publishing, Inc., Grand Haven, MI (US)

( * ) Notice: Subject to any disclaimer, the term of this patent is extended or adjusted under 35 U.S.C. 154(b) by 62 days.

(21) Appl. No.: 14/153,965

(22) Filed: Jan. 13, 2014

Related U.S. Application Data (63) Continuation of application No. 12/968,174, filed on Dec. 14, 2010, now Pat. No. 8,631,089.

(51) Int. Cl.
*G06F 3/16* (2006.01)

(52) U.S. Cl.
CPC ..................................... *G06F 3/165* (2013.01)

(58) Field of Classification Search
None
See application file for complete search history.

(56) References Cited

U.S. PATENT DOCUMENTS

| | | |
|---|---|---|
| 5,848,413 A | 12/1998 | Wolff |
| 5,933,829 A | 8/1999 | Durst et al. |
| 5,978,773 A | 11/1999 | Hudetz et al. |
| 6,108,656 A | 8/2000 | Durst et al. |
| 6,199,048 B1 | 3/2001 | Hudetz et al. |
| 6,434,561 B1 | 8/2002 | Durst, Jr. et al. |
| 6,542,933 B1 | 4/2003 | Durst, Jr. et al. |
| 6,543,052 B1 | 4/2003 | Ogasawara |
| 6,616,049 B1 | 9/2003 | Barkan et al. |
| 7,552,068 B1 | 6/2009 | Brinkerhoff |
| 8,069,088 B1 | 11/2011 | Foulser et al. |
| 8,429,028 B2 | 4/2013 | Hendricsk et al. |
| 8,447,066 B2 | 5/2013 | King et al. |

(Continued)

FOREIGN PATENT DOCUMENTS

| | | |
|---|---|---|
| EP | 1465071 | 10/2004 |
| WO | WO 01/42894 | 6/2001 |

(Continued)

OTHER PUBLICATIONS

About Microsoft Tag—Connecting Real Life and the Digital World using Mobile Barcodes!.. http://tag.microsoft.com/overview.aspx, printed Oct. 29, 2010, in 2 pages.

(Continued)

*Primary Examiner* — Hassan Phillips
*Assistant Examiner* — Omeed D Rahgozar
(74) *Attorney, Agent, or Firm* — Knobbe, Martens, Olson & Bear, LLP (57) ABSTRACT

Systems and methods are provided for previewing audio data associated with an audio book or other item. In some embodiments, following capture by a mobile computing device of an image of a graphical code included on packaging associated with an audio book, a request may be received from the mobile computing device for audio data and/or other data associated with the audio book. The request may include a uniform resource identifier generated using the graphical code from the image captured by the mobile computing device. In response to receiving the request, audio data associated with the audio book may be retrieved from a data store. The retrieved audio data may then be sent to the mobile computing device for playback by the mobile computing device.

19 Claims, 7 Drawing Sheets

(56) References Cited

U.S. PATENT DOCUMENTS

| | | | |
|---|---|---|---|
| 2001/0011276 | A1 | 8/2001 | Durst, Jr. et al. |
| 2001/0032252 | A1 | 10/2001 | Durst, Jr. et al. |
| 2001/0047428 | A1 | 11/2001 | Hunter |
| 2001/0054008 | A1 | 12/2001 | Miller et al. |
| 2002/0002496 | A1 | 1/2002 | Miller et al. |
| 2002/0003166 | A1 | 1/2002 | Miller et al. |
| 2002/0007307 | A1 | 1/2002 | Miller et al. |
| 2002/0016750 | A1 | 2/2002 | Attia |
| 2002/0022963 | A1 | 2/2002 | Miller et al. |
| 2002/0022992 | A1 | 2/2002 | Miller et al. |
| 2002/0022993 | A1 | 2/2002 | Miller et al. |
| 2002/0022994 | A1 | 2/2002 | Miller et al. |
| 2002/0022995 | A1 | 2/2002 | Miller et al. |
| 2002/0023959 | A1 | 2/2002 | Miller et al. |
| 2002/0026357 | A1 | 2/2002 | Miller et al. |
| 2002/0026358 | A1 | 2/2002 | Miller et al. |
| 2002/0026369 | A1 | 2/2002 | Miller et al. |
| 2002/0029181 | A1 | 3/2002 | Miller et al. |
| 2002/0030105 | A1 | 3/2002 | Miller et al. |
| 2002/0046093 | A1 | 4/2002 | Miller et al. |
| 2002/0065717 | A1 | 5/2002 | Miller et al. |
| 2002/0072970 | A1 | 6/2002 | Miller et al. |
| 2002/0107759 | A1 | 8/2002 | An |
| 2003/0051253 | A1 | 3/2003 | Barone |
| 2003/0208396 | A1 | 11/2003 | Miller et al. |
| 2005/0049907 | A1 | 3/2005 | Kumar et al. |
| 2007/0192438 | A1* | 8/2007 | Goei .................... 709/219 |
| 2008/0103812 | A1 | 5/2008 | Tobin et al. |
| 2009/0164602 | A1 | 6/2009 | Kies et al. |
| 2009/0307078 | A1 | 12/2009 | Mithal et al. |
| 2010/0092095 | A1 | 4/2010 | King et al. |
| 2010/0174599 | A1 | 7/2010 | Rosenblatt et al. |
| 2010/0217663 | A1 | 8/2010 | Ramer et al. |
| 2011/0029363 | A1 | 2/2011 | Gillenson et al. |
| 2011/0145068 | A1* | 6/2011 | King et al. ............... 705/14.55 |
| 2011/0238474 | A1 | 9/2011 | Carr et al. |
| 2012/0096523 | A1 | 4/2012 | Ollila et al. |

FOREIGN PATENT DOCUMENTS

| | | |
|---|---|---|
| WO | WO 02/15118 | 2/2002 |
| WO | WO 02/15120 | 2/2002 |

OTHER PUBLICATIONS

Baig, E.C., "Radical Gizmos Arrive at Demo Conference," USA Today: CyberSpeak, Feb. 13, 2002, <www.usatoday.com/tech/columnist/2002/02/13/baig.html> [retrieved Oct. 15, 2004].

"Bango.net: Camera-Enabled Mobiles and PDAs Scan Barcodes for Instant Access to WAP," Cambridge 3G, Sep. 10, 2002, <www.cambridge3g.com/pooled/articles/BF_NEWSART/view.asp?Q=BF_NEWSART_36234> [retrieved Oct. 15, 2004].

"Best Buy adds QR codes to product fact tags", http://www/retailcustomerexperience.com/article/140212/Best-Buy-adds-QR-codes-to-product-fact-tags, printed Oct. 29, 2010 in 3 pages.

"Bookstores Tap Amazon.com Info," Jul. 25, 2003, Channel NewsAsia, <www.channelnewsasia.com/stories/technologynews/view/45292/1/html> [retrieved Jul. 28, 2003].

"Camera Phone Clicks as a Credit Card," Jul. 30, 2003, CNETAsia [online], [retrieved Aug. 1, 2003].

"Camera Phones Used to Check Football Membership Cards," Jan. 28, 2004, <www.cellular-news.com/story/10508_print.shtml> [retrieved Feb. 17, 2004].

"Finnish Lapland—More Than Meets the Eye," e.Finland—Technology Serving People, Mar. 20, 2003, www.e.finland.fi/netcomm/news/showarticle.asp?intNWSAID=13208 [retrieved Oct. 15, 2004].

GeraCap BarReader, GeraCap Oy (Symbian Platinum Partner), Seinajoki, Finland, www.barreader.com, 2-page brochure.

Gilbert, A., "MIT to Uncork Futuristic Bar Code," Aug. 29, 2003, CNETNews.com: Tech News First [online], [retrieved Sep. 3, 2003].

"iTunes is the world's easiest way to organize and add to your digital media collection", http://itunes.apple.com/us/app/gr-scanner/id377643590?mt=8, printed Oct. 25, 2010 in 2 pages.

"Lavasphere SDK—Software Enabling Mobile Camera Phones to Read Bar Codes and 2d Codes," Press Release, ©2004 Gavitec AG—Mobile Digit, Feb. 21, 2002 [retrieved Oct. 15, 2004].

Marek, S., "Camera Phones Capture Bar Codes," Feb. 15, 2004, Wireless Week, <www.wirelessweek.com/index.asp?layout=articlePrint&articleID=CA381641> [retrieved Feb. 17, 2004].

Red Ferret Journal, The [online blog], Feb. 23, 2002, <www.enorgis.com/arc20020217.htm> [retrieved Oct. 15, 2004], 7 pages.

ScanImage™ 1470B, Intermec, www.intermec.com/cgi-bin/ASP/Print_ProductsShowdetail.asp?Category=SCAN&Family=Sca . . . [retrieved Dec. 30, 2003], 3 pages.

"ScoutPal.com: Advanced Tools for Amazon Sellers," ©2002-2005 ScannerPal, Inc., <www.scoutpal.com> [retrieved Sep. 9, 2005].

Sharkey, Jeffrey, "Android Developer Challenge", http://scan.jsharkey.org, printed Oct. 11, 2010 in 8 pages.

Soto Ouchi, M., "Small Sellers Get the Amazon.com Edge," Jun. 7, 2004, The Seattle Times, <seattletimes.nwsource.com/html/businesstechnology/2001949623_amazonweb07.h5ml> [retrieved Sep. 9, 2005].

Sundgot, J. (ed.), "Point and Receive With a Twist," infoSync World, Jan. 8, 2002, www.infosyncworld.com/system/print.php?id=2131 [retrieved Oct. 15, 2004].

Jan. 23, 2009 European Search Report EP 04815119, 3 pages.

\* cited by examiner

INTERESTING STORY
Customer Reviews — 602

Reader Rating: ★★★★ — 604
(151 Ratings)

RATING FOR:

★★★★ Characters — 606
★★★ Plot
★★★ Writing Style

IT IS:

★★★ Dramatic
★★★★ Touching
★★ Romantic

GOOD FOR:

★★★ Book Clubs
★★★★ Escapism
★★ Permanent Library
★★★★ Gift Giving

<u>Read Reviews</u>       <u>View Book Details</u>
   — 608                      — 610

PREVIEWING AUDIO DATA ASSOCIATED WITH AN ITEM

CROSS-REFERENCE TO RELATED APPLICATION

This application is a continuation of and claims benefit of priority to U.S. patent application Ser. No. 12/968,174, filed Dec. 14, 2010, entitled "PREVIEWING AUDIO DATA ASSOCIATED WITH AN ITEM," which is hereby incorporated herein by reference in its entirety.

BACKGROUND

Publishers and/or authors frequently offer audio versions of their books or other written works to consumers. Audio books and other narration audio recordings are often sold on a recorded medium, such as a compact disc or cassette tape. Audio recordings, such as audio books, are often offered in formats and/or packaging such that a potential purchaser is not able to preview the audio content without opening the packaging. Furthermore, once the packaging is opened, the consumer typically must have access to an appropriate player device, such as a compact disc player, in order to sample the audio recording. Accordingly, potential customers of the retail edition of an audio book (or library patrons considering borrowing the audio book) often must rely on reading a synopsis or other promotional material included on the packaging. The potential customer is typically not able to hear a sample of the audio recording itself, thus missing a key attribute of the audio book or other recording when evaluating the item for potential purchase or other consumption.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to enabling a user to preview audio data and/or other content associated with an item, such as an audio book or other audio recording. In some embodiments, a content server as disclosed herein provides a potential purchaser or consumer of a retail audio book stored on a recorded medium (such as a packaged compact disc or cassette tape) with a convenient way to sample the audio recording of the audio book without opening the packaging and/or without playing the actual recorded medium. In some embodiments, a graphical code may be placed on an item or the packaging of the item by a content creator, such as an author or publisher. When the graphical code is scanned, digitally photographed, or otherwise captured by a user computing device configured with appropriate executable instructions, the computing device may request, from the content server, audio data or other information identified by the graphical code. For example, the graphical code may be a two-dimensional graphical code that can be translated or decoded by the user computing device to generate a uniform resource identifier ("URI") established by the content creator to enable users to access audio data and other content associated with an item on which the graphical code has been placed. In some embodiments, the user computing device that captured the graphical code may present the user with a user interface generated by the content server that enables the user to play a portion of the audio content of the audio book or other item.

As will be appreciated, a "graphical code" as used herein may refer to a code in any of a variety of formats. For example, the graphical code may be a barcode, pattern or graphic that is capable of conveying information such as a URI, item identifier, or other information as a result of the graphical code being decoded or interpreted by a configured computing device. In some embodiments, the graphical code may be a two-dimensional code or matrix barcode that consists of black modules or blocks arranged in a square matrix pattern on a white background. Methods and systems for generating such graphical codes are well known to those skilled in the art and, thus, need not be described in more detail herein. In other embodiments, a graphical code may include colors and/or symbols.

A "content creator" as used herein may refer to any individual or entity involved in creation of an item (for example, an audio book or other audio recording) and/or holds rights in the item, such as an author, publisher, narrator, editor, etc. While a content creator is often used in the present disclosure as an example of the individual or entity responsible for determining the graphical code to be placed on an item and/or providing audio or other preview content to the content server, in some embodiments, an individual or entity other than a content creator may alternatively or additionally perform such actions. For example, a retailer or merchant may place the graphical code on the item and/or provide content or information to the content server to be sent to user computing devices that capture an image of the graphical code.

Figure 1:
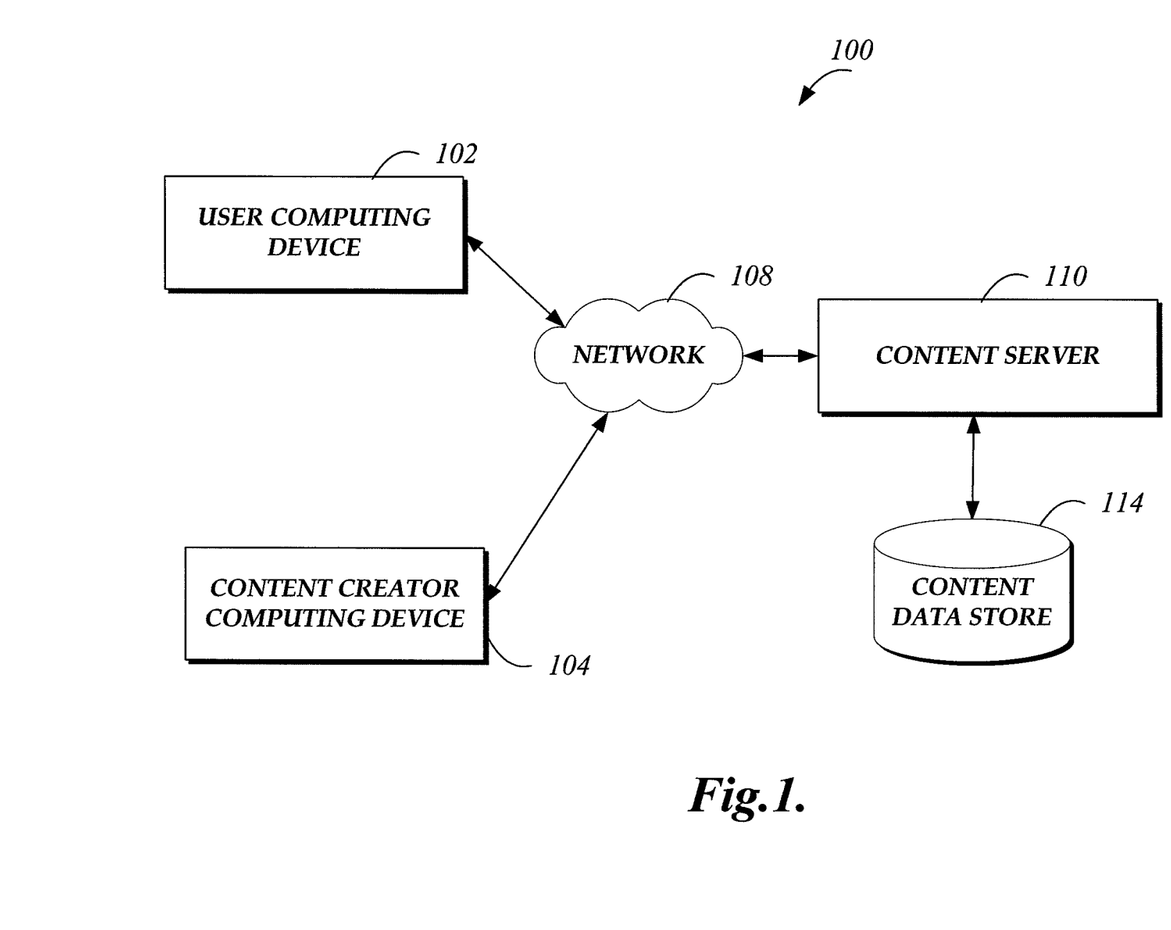
FIG. 1 is a block diagram depicting an illustrative operating environment in which a user may request an audio sample and other information associated with an audio book by capturing with a computing device an image of a graphical code included on the audio book's packaging.

FIG. 1 depicts an illustrative operating environment 100 in which a content creator computing device 104 may send audio previews and other content associated with a book to content server 110, and in which a user may request an audio sample and other information associated with a book by capturing with user computing device 102 an image of a graphical code included on the book's packaging. The depicted environment 100 includes a user computing device 102, a content creator computing device 104, and a content server 110 communicatively connected by a network 108, such as the Internet. Those skilled in the art will recognize that the user computing device 102 and/or content creator computing device 104 may be any of a number of computing devices that are capable of communicating over a network including, but not limited to, a laptop, personal computer, tablet computer, electronic book reader, personal digital assistant (PDA), hybrid PDA/mobile phone, mobile phone, and the like. In certain embodiments, for example, the user computing device 102 may be a mobile computing device, such as a mobile phone or tablet computer that includes or communicates with a camera or other optical sensor.

In the illustrated embodiment, the content creator computing device 104 may present for display to a content creator or other user one or more user interfaces (such as that shown in FIG. 7) for sending audio or other content to the content server 110 and/or for reviewing data related to user activity associated with the capture of a graphical code. In other embodiments, an operator or user of the content server 110 may determine the audio or other content to be provided to users when a code is captured by a user computing device, such that the content creator computing device 104 is not necessary in certain embodiments. In some embodiments, the content creator computing device 104 may include computer hardware and software components similar to those described below with respect to the content server 110.

In the environment shown in FIG. 1, the user computing device 102 and/or content creator computing device 104 may communicate with the content server 110 via a communication network 108, such as the Internet or other communications link. Communications between the user computing device and/or content creator computing device and the content server may be secure, such as by encrypting or encoding the data exchanged.

As further illustrated in FIG. 1, the content server 110 includes or communicates with a content data store 114. The content data store 114 may include information associated with items, such as audio books. The information may include a summary of the item, user reviews of the item, audio data that provides a sample or preview of the item, audio or video interviews with a content creator of the item, etc. In some embodiments, the content data store 114 may additionally include pricing information for the item, and/or data regarding the availability of the item from one or more retailers or merchants. Those skilled in the art will appreciate that the content data store 114 may be local to the content server 110, may be remote to the content server 110, and/or may be a network-based service itself. Those skilled in the art will appreciate that the network 108 may be any wired network, wireless network or combination thereof. In addition, the network 108 may be a personal area network, local area network, wide area network, cable network, satellite network, cellular telephone network, etc., or combination thereof. Protocols and components for communicating via the Internet or any of the other aforementioned types of communication networks are well known to those skilled in the art of computer communications and, thus, need not be described in more detail herein.

Figure 2:
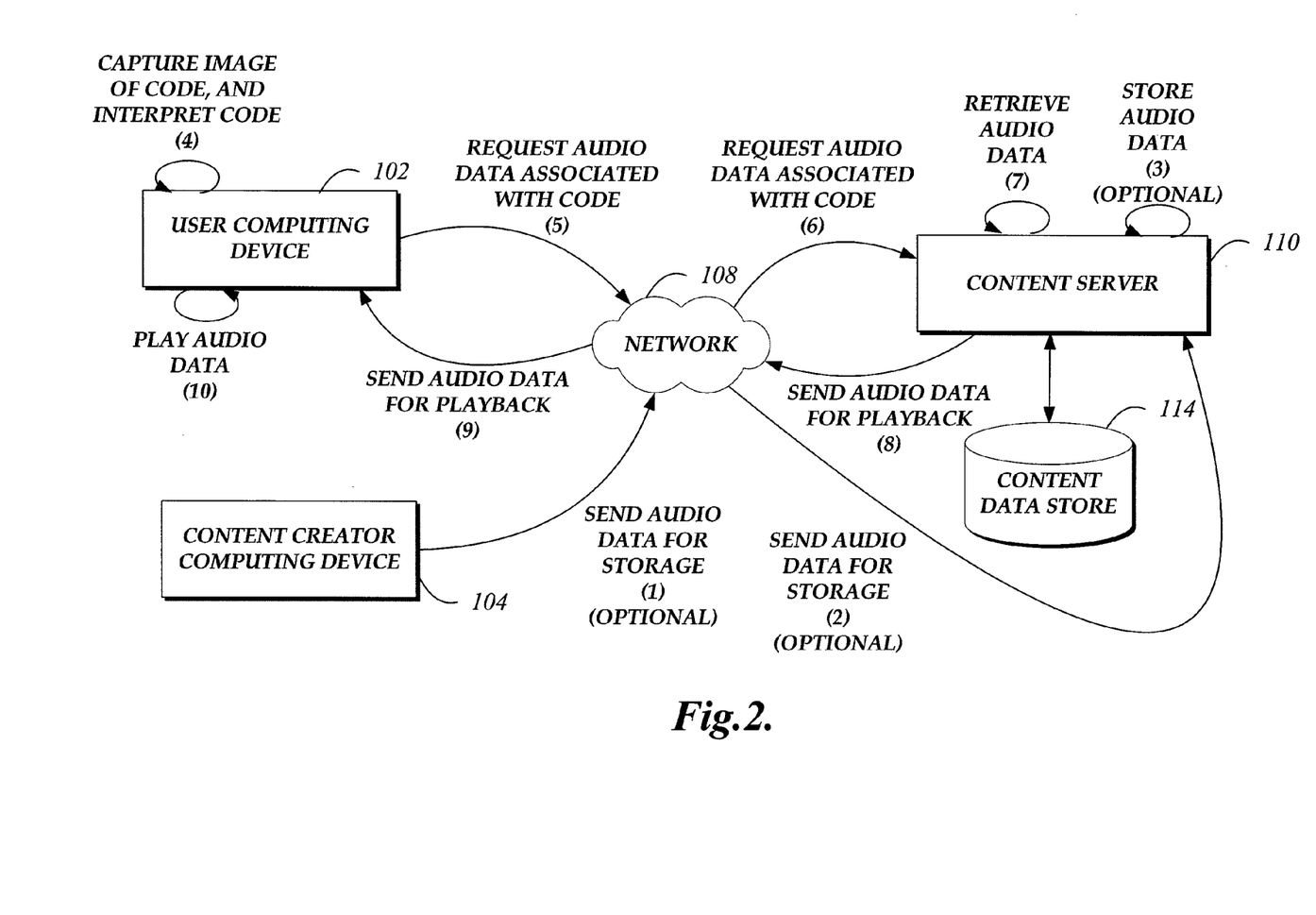
FIG. 2 is a block diagram illustrating a computing device within the operating environment of FIG. 1 requesting audio data associated with a graphical code placed on an audio book or other item and captured by a camera of the computing device, and the computing device receiving preview audio data associated with the audio book.

FIG. 2 is a block diagram illustrating the user computing device 102 within the operating environment of FIG. 1 requesting audio data associated with a graphical code of a book and receiving sample audio data associated with the book, where an image of the graphical code of the book has been captured by a camera or other optical sensor of the user computing device. In the embodiment illustrated in FIG. 2, the audio data (or other content data, such as video data) that is requested may have previously been provided to the content server 110 by a content creator using content creator computing device 104. More specifically, the content creator computing device 104 may optionally send audio data to the content server 114 for storage in content data store 114. The audio data may be, for example, a portion of audio data from an audio book, an audio summary of the book, an audio interview with the author, narrator, or other content creator, etc. In some embodiments, additional non-audio data may be sent from the content creator computing device to the content server, such as text or video data. The content creator computing device 104 may provide the audio or other data via a user interface generated by the content server 110 for display on the content creator computing device 104, such as the illustrative user interface discussed below with respect to FIG. 7.

Once the content server 110 receives the audio or other data from the content creator computing device 104, the content server 110 may store the audio data in content data store 114, such that the data is available to be sent to a user computing device when requested. In some embodiments, as discussed above, the content data store 114 may include audio data and/or other content associated with one or more audio books or other items without receiving any data from a content creator computing device, such as content creator computing device 104. For example, in some embodiments, the content server 110 may automatically generate the audio data by selecting a portion of the audio content of the audio book. In other embodiments, the audio data may be selected by a user of the content server 110 without communicating with a content creator computing device.

Once the content data store 114 includes audio preview data and/or other data that may be provided to a potential purchaser or consumer of an audio book or other item, the content server 110 may receive requests for such content from one or more computing devices, such as a mobile computing device that has captured an image of a graphical code that identifies content that is accessible via the content server 110 (for example, audio data that may be presented via a URI generated by the content server). As discussed in more detail below with respect to FIG. 4, the graphical code may be printed or otherwise included on an item or packaging of an item that a potential consumer of the item may find in a retail store, library or other location. The graphical code may have been generated by a computing device, such as a computing device configured with components similar to those of the content server 110, discussed below with respect to FIG. 3. The graphical code may have been printed by a manufacturer, publisher, retailer, or other entity responsible for the packaging and/or stocking of items. As will be discussed further below, the graphical code may be specific to the item and/or store in which the item is offered.

The potential consumer or other user of the user computing device 102 may capture an image of the item's graphical code using a computer program previously installed on the user computing device, and/or embodied in hardware or firmware of the user computing device, in combination with a digital camera or other optical sensor that is part of the user computing device 102 or in communication with the user computing device 102. The user computing device may decode or interpret the graphical code to determine the encoded text, URI or other message represented by the code. In other embodiments, the graphical code may be sent to and interpreted by another computing device, such as content server 110. In some embodiments, the graphical code may represent or correspond to a URI that identifies the location of content available from the content server 110, such as audio data and/or a user interface that includes item details related to the item on which the code has been printed or attached. In some embodiments, the graphical code may additionally or alternatively represent item identification information uniquely identifying the item on which the code has been printed or attached, which the user computing device may send to the content server 110.

In the embodiment illustrated in FIG. 2, the user computing device 102 captures the image of the graphical code. The user computing device 102 then decodes or interprets the graphical code, in the illustrated embodiment, in order to generate a URI that the graphical code represents. The user computing device then requests the URI over the network 108, such as via a browser program or other program operating on the user computing device. In the illustrated embodiment, a request for the URI causes the content server 110 to generate a user interface that includes an audio sample of the audio book or other item (or a selectable option to play an audio sample), such as the user interface illustrated in FIG. 5, discussed below. In response to receiving the request, the content server 110 retrieves from content data store 114 the audio data and/or other data associated with the request URI that the user computing device 102 interpreted or decoded from the graphical code. The content server may then generate a user interface that includes the audio data and/or other information associated with the item based on information included in the URI. For example, the URI may be unique to the item, such that the content server 110 determines the identity of the item based on the URI request. The content server 110 then sends the generated user interface to the user computing device for display, and/or sends the sample audio data to the user computing device for playback. When the user computing device 102 receives the generated user interface from the content server 110, the user computing device may present the user interface for display with a selectable option that the user may select to play the sample audio data, as discussed below in reference to FIG. 5. In other embodiments, the user computing device may automatically play the sample audio without any further selection or action by the user.

As discussed further below, in some embodiments, the content server 110 may store information associated with the user and/or the user computing device 102 in one or more data stores (not illustrated). For example, the content server 110 may store geographical location information of the user computing device which may have been determined by the user computing device or by a service or network provider and sent to the content server along with the URI request. The user computing device 102 may have determined the physical or geographical location of the user computing device, for example, by a global positioning system ("GPS") component or triangulation component of the user computing device. In some embodiments, the content server 110 may store in one or more data stores information identifying the user computing device (such as a phone number or device identification number), and/or information identifying the user (such as an email address of the user, or an account name of the user associated with either the content server or a retailer).

Though not illustrated in FIG. 2, in some embodiments, the content server 110 may determine, a predetermined amount of time (such as a day or week) after receiving the URI request, whether the user of the user computing device 102 purchased the associated item. For example, the content server 110 may offer the item for purchase via one or more user interfaces presented for display on the user computing device 102. Accordingly, the content server may identify the user based on account information of the user associated with the content server 110, and/or information identifying the user computing device 102. The content server 110 also may determine that the user purchased the item based on a unique discount code provided to the user in response to the URI request and subsequently provided to a retailer by the user upon purchase of the item, as discussed below in reference to FIG. 5.

In some embodiments, if the content server 110 determines that the user did not purchase the item after the predetermined amount of time (or if the content server is unable to determine whether the user purchased the item after the predetermined amount of time), the content server 110 may provide the user with additional information associated with the item. For example, the additional information may be sent to the user computing device 102 by text message, may be sent to the user by email, and/or may be presented to the user via a user interface associated with an account of the user (such as an account associated with the content server 110). The additional information may include, for example, additional audio data associated with the item (such as an additional sample chapter of an audio book) or additional promotional material (such as information regarding upcoming or recently released items associated with a content creator of the item, or information regarding upcoming book signing events of the author of the item). In some embodiments, the additional information may include sample audio data of a second audio book that is based on the same book content as an audio book that the user previously sampled, but that is narrated by a different narrator. In some embodiments, the additional information may be selected based on feedback received from the user. For example, the user may indicate whether the user liked the narrator, the author, or some other content creator associated with the item. The additional information may then include information associated with that content creator.

If the content server 110 determines that the user purchased the item within the predetermined amount of time, the content server 110 may provide the user with information associated with one or more additional items that are similar to the purchased item. For example, the content server 110 may provide the user with audio data associated with a second audio book that is associated with the same content creator as the purchased audio book (such as the same author and/or narrator). As another example, the content server 110 may provide the user with audio data and/or other data regarding one or more items that the content server 110 has determined are similar to the purchased item based on other users' purchase histories, item ratings, browsing activities, wish list activities, etc.

Figure 3:
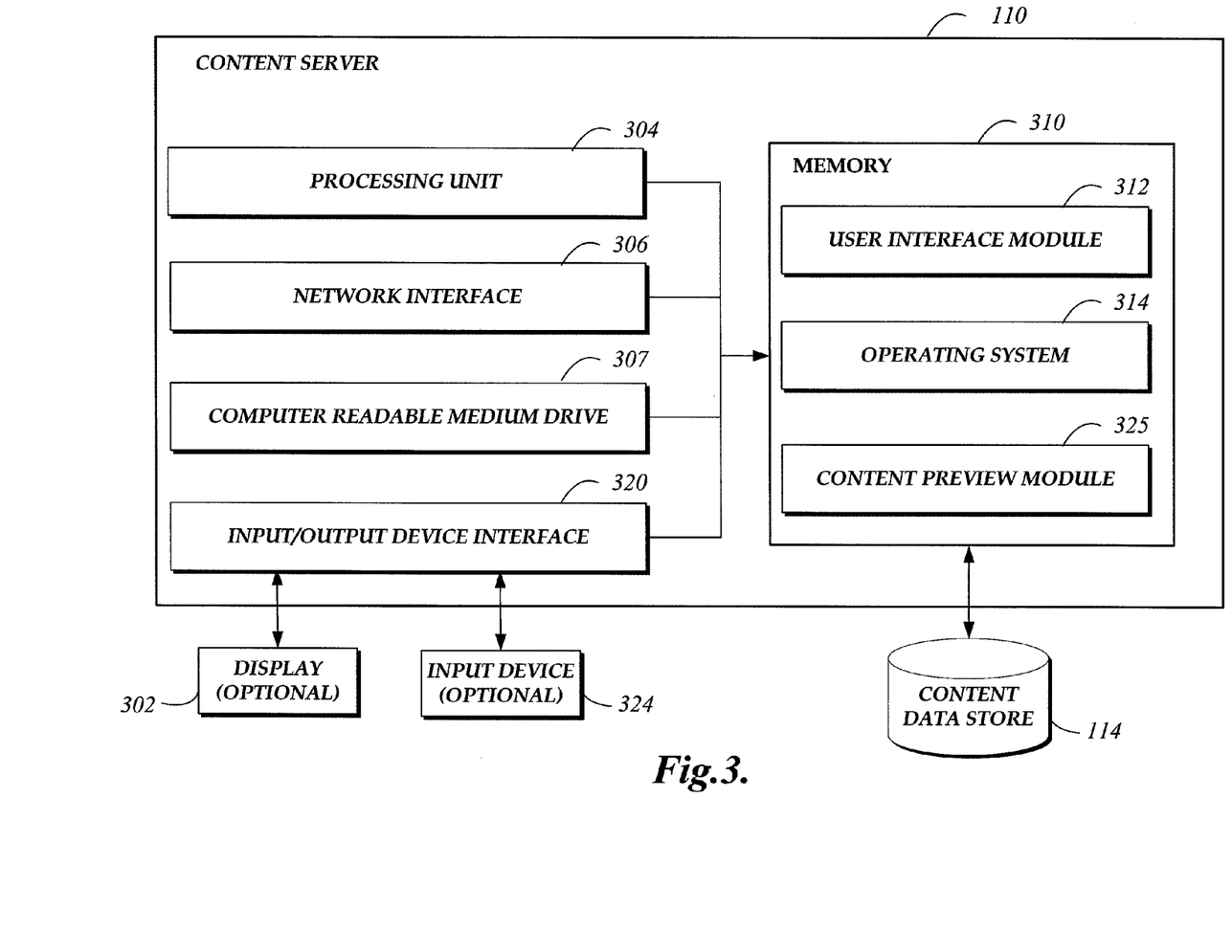
FIG. 3 depicts a general architecture of a content server for sending audio previews and other content to a user computing device.

FIG. 3 depicts a general architecture of the content server 110 illustrated in FIG. 1. The embodiment of content server 110 depicted in FIG. 3 includes an arrangement of computer hardware and software components that may be used to implement aspects of the present disclosure. Those skilled in the art will appreciate that the content server 110 may include many more (or fewer) components than those shown in FIG. 3. It is not necessary, however, that all of these generally conventional components be shown in order to provide an enabling disclosure. As illustrated in FIG. 3, the content server 110 includes a network interface 306, a processing unit 304, an input/output device interface 320, and a computer readable medium drive 307, all of which may communicate with one another by way of a communication bus. As illustrated, the content server 110 is optionally associated with, or in communication with, a display 302, and an input device 324. The network interface 306 may provide the content server 110 with connectivity to one or more networks or computing systems. The processing unit 304 may thus receive information and instructions from other computing systems or services via a network. The processing unit 304 may also communicate to and from memory 310 and further provide output information for an optional display 302 via the input/output device interface 320. The input/output device interface 320 may accept input from the optional input device 324, such as a keyboard, mouse, digital pen, touch screen, or gestures recorded via motion capture.

The memory 310 contains computer program instructions that the processing unit 304 executes in order to implement one or more embodiments of the present disclosure. The memory 310 generally includes RAM, ROM and/or other persistent or non-transitory memory. The memory 310 may store an operating system 314 that provides computer program instructions for use by the processing unit 304 in the general administration and operation of the content server 110. The memory 310 may further include other information for implementing aspects of the present disclosure. For example, in one embodiment, the memory 310 includes a user interface module 312 that facilitates generation of user interfaces (such as by providing instructions therefor) for display upon a computing device. For example, a user interface may be displayed via a navigation interface such as a web browser installed on the computing device. In addition, memory 310 may include or communicate with an auxiliary content data store 114. Data stored in the content data store 114 may include audio data and/or other data associated with audio books or other items, as discussed above.

In addition to the user interface module 312, the memory 310 may include a content preview module 325 that may be executed by the processing unit 304. In one embodiment, the content preview module 325 may be used to implement various aspects of the present disclosure, such as retrieving audio data or other information associated an item, and analyzing user activity associated with requests for such content, as described further below. In certain embodiments of the present disclosure, the user computing device 102 and/or content creator computing device 104 may include several components that operate similarly to the components illustrated as part of the content server 110, including a user interface module, processing unit, computer readable medium drive, etc.

Figure 4:
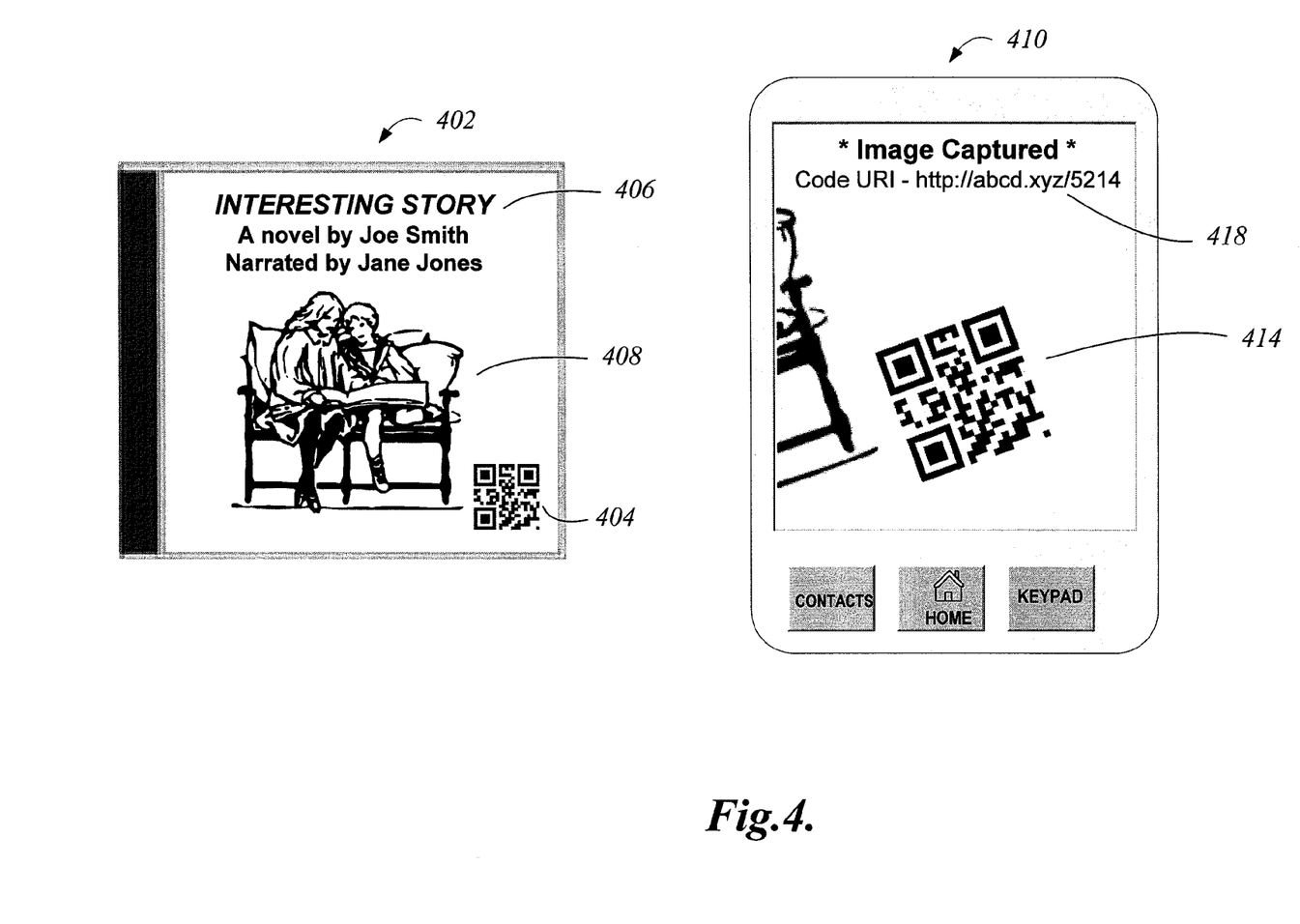
FIG. 4 depicts an image of a graphical code included on the packaging of an audio book item being captured by a camera of the user computing device.

FIG. 4 depicts an image of a graphical code 414 included on the packaging of an audio book item 402 being captured by a camera of a mobile computing device 410 (which may be one example of a user computing device, similar to user computing device 102 discussed above). As illustrated, the packaging of the audio book item 402 is a compact disc case that may include a compact disc storing audio data of the audio book. The case or packaging of the audio book 402 includes title information 406, which indicates that the audio book is titled "Interesting Story." The title information 406 also includes text identifying the author ("Joe Smith") and the narrator ("Jane Jones"), both of which may be considered a content creator associated with the audio book 402. The packaging of the audio book 402 also includes cover art 408.

As illustrated, the packaging of the audio book item 402 includes a graphical code 404. The graphical code, in some embodiments, may be printed on the item or the packaging of the item. In other embodiments, the graphical code 404 may be, for example, a sticker placed on top of shrink wrap or other outer packaging material. The graphical code may be placed on the item at any of a variety of points in the product supply chain. For example, the graphical code 404 may be placed on the item 402 by a publisher, a distributor, a retailer, etc. Accordingly, different copies of the same audio book or other item may have a different graphical code placed thereon based on the retail location where the item is being sold. If desired, a retailer or seller of the item may periodically replace or update the graphical code with a different graphical code that represents, for example, a different URI than the original graphical code placed on the item. In some embodiments, a retailer may place the graphical code on a card or other placeholder rather than on the item itself. In such embodiments, a user computing device may capture an image of the graphical code even if a retailer does not actually have a physical copy of the item in inventory.

As illustrated in FIG. 4, mobile computing device 410 has captured an image 414 of the graphical code 404 placed on audio book item 402. The mobile computing device 410 may be, for example, a mobile phone that includes a camera lens that the user has aimed at the graphical code 404 of audio book item 402. The user may have done so, for example, in order to learn more information about the audio book item 402, and/or to listen to sample audio data of the audio book item 402. In some embodiments, the user may have first opened or launched a computer program previously installed on the mobile computing device 410 that enables the mobile computing device to interpret or decode graphical codes such as graphical code 404. In other embodiments, functionality for interpreting or decoding such graphical codes may be embodied in hardware or firmware of the mobile computing device. As illustrated on the display of mobile computing device 410, the image of the graphical code 414 has been interpreted or decoded by the mobile computing device to generate URI 418. The referenced URI 418 may be, for example, a URI established by a publisher of the audio book 402 that enables the user to preview audio content of the audio book 402, as discussed further below.

Figure 5:
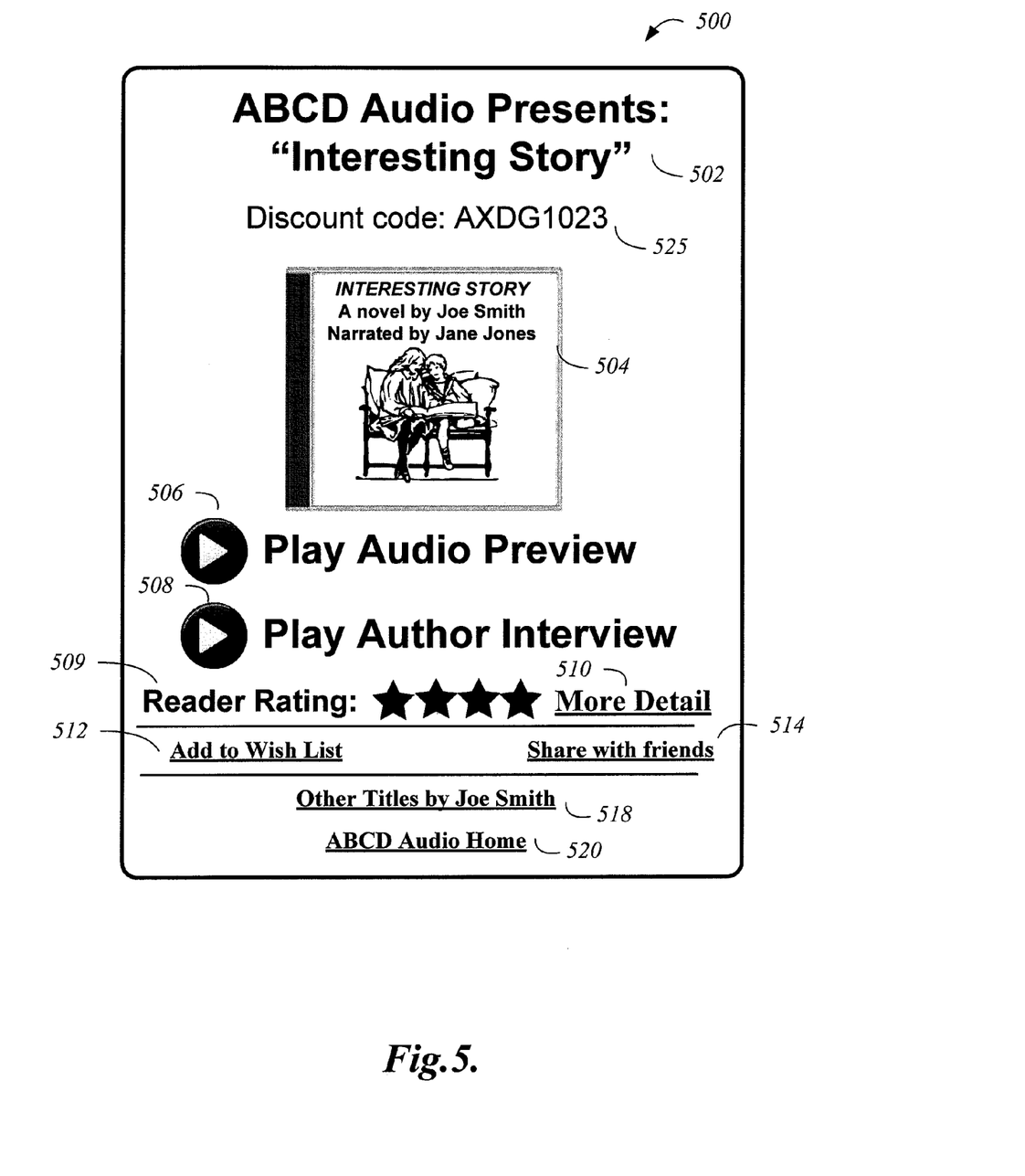
FIG. 5 is an illustrative user interface generated by the content server for previewing audio data associated with an item for which an associated graphical code has been captured by the user computing device.

FIG. 5 is an illustrative user interface 500 generated by the content server 110 for previewing audio data associated with a book for which a graphical code has been captured by a user computing device, such as user computing device 102. For example, user interface 500 may be presented for display on a browser operating on the mobile computing device 410 (which is one example of a user computing device), discussed above with respect to FIG. 4, in response to the mobile computing device requesting the URI 418 generated from the graphical code 414 illustrated in FIG. 4. As illustrated, user interface 500 includes title information 502 identifying the audio book in which the user has expressed interest by capturing the associated graphical code, as well as an image of the audio book 504. The audio book may have been identified by the content server based on the URI requested by the user computing device 102. For example, the URI may be specific to the given audio book item 504, and/or may contain information identifying the audio book item 504. As illustrated, user interface 500 includes a selectable option 506 for causing the user computing device 102 to play an audio preview of the audio book 504. Selection of option 506 may cause, for example, the user computing device 102 to play a portion of audio data via speakers, headphones or other audio output component associated with the user computing device.

The audio preview may include, for example, audio data of the first chapter of the audio book, the first minute of the audio book recording, or any other portion of the audio data. The audio data may have been selected as a preview portion, for example, by a content creator associated with the audio book, as discussed below. The content server 110 may send the audio data to the user computing device in response to a request from the user computing device 102 after the user has selected option 506. In other embodiments, the content server 110 may send the audio data in response to the initial request for the URI generated from the graphical code, either in addition to or instead of a generated user interface. For example, the audio data may begin playback on the user computing device automatically as a result of the user computing device requesting the URI associated with the graphical code, without any further selection by the user.

User interface 500 also includes a selectable option 508 for playing on the user computing device 102 an author interview related to audio book 504. For example, the author interview may include pre-recorded audio and/or video of the author discussing the content of audio book 504. In response to the selection of option 508, the author interview audio data may be retrieved by the content server 110 from the content data store 114 and sent to the user computing device 102. As will be appreciated, a variety of additional audio, text and/or video data related to audio book 504 may be provided to the user via one or more user interfaces similar to user interface 500.

User interface 500 includes a reader rating 509 associated with audio book 504, representing the average rating given to the audio book by users that have reviewed the audio book. The review data, which will be discussed in more detail with reference to FIG. 6 below, may be retrieved by the content server 110 from content data store 114, and/or one or more other data stores. The user may select option 510 to view more detailed review information associated with audio book 504, such as the information illustrated in user interface 600, discussed below. The user may select "Add to Wish List" option 512 in order to add the audio book item 504 to a wish list of items that the user is interested in purchasing or receiving as gifts. The wish list may be associated with the user's account with the content server 110 or a related retailer or other entity. In some embodiments, the user and the associated account may be identified from information stored in memory of the user computing device 102, such as a "cookie" associated with a browser or other program. In other embodiments, the user may be identified by information identifying the user computing device 102, such as a phone number, that the user computing device 102 has sent to the content server 110. In other embodiments, the user's identity may not be known until the user provides account information to the content server 110, such as a user name and password associated with the user's account.

Illustrative user interface 500 also includes a "Share with friends" option 514. Option 514, in some embodiments, may enable the user to indicate an interest in audio book 504 to friends or other social connections of the user on one or more social networking services. In other embodiments, the content server 110 may enable the user to select one or more friends or other contacts of the user to whom the user would like the content server 110 to send information regarding audio book item 504, such as via email, text message, a message on a social networking service, etc. User interface 500 additionally includes an option 518 that the user may select in order to view other titles by the author of audio book item 504. For example, the other titles may include audio book titles by different narrators than audio book item 504. The user may select this option, for example, if the user is interested in works of the author, but did not like the narrator's voice or other qualities of the audio sample that the user previewed via user interface 500. The user may select text 520, "ABCD Audio Home," in order to view information regarding the publisher or retailer associated with the content server 110, which may include information regarding other items available from the publisher or retailer, such as books, audio books, electronic books, etc.

User interface 500 includes a discount code 525. In some embodiments, the discount code may be a unique letter and/or number sequence generated by the content server 110 each time a user requests a URI generated from a captured graphical code image. The user may, in some embodiments, use the discount code to receive a discount or promotional rate on the item associated with the captured graphical code. For example, the user may provide the discount code during the checkout process at a retail store where the user is purchasing the item. The retailer may then, in some embodiments, notify the content server 110 of the discount code provided by the user and associated with the purchase, which may be unique to the user and item combination. Accordingly, the content server 110 may determine that the user purchased the item and store this purchase information in one or more data stores.

In some embodiments, the options and text presented in the user interface displayed to a user that has requested a URI generated from a graphical code, such as illustrative user interface 500, may depend on the location of the user. For example, in some embodiments, the content server may determine the content to send to the user computing device 102 based at least in part on location information received from the user computing device at the time of the image capture containing the graphical code. For example, the content server 110 may select the preview audio data and/or other information related to the item that is sent to the user computing device based on the user's location, such as country, state, city, retailer, etc. In some embodiments, the content server may determine the content to send to the user computing device 102 based in part on whether the user has previously requested the URI generated from the graphical code. As will be appreciated, the content sent to a user computing device in response to a request for a given URI may change over time. For example, a request for a URI generated from a graphical code printed on an author's first published book may result in the content server generating a user interface that includes information regarding a newer book by the author, even if the newer book had not yet been written at the time the graphical code was printed.

Figure 6:
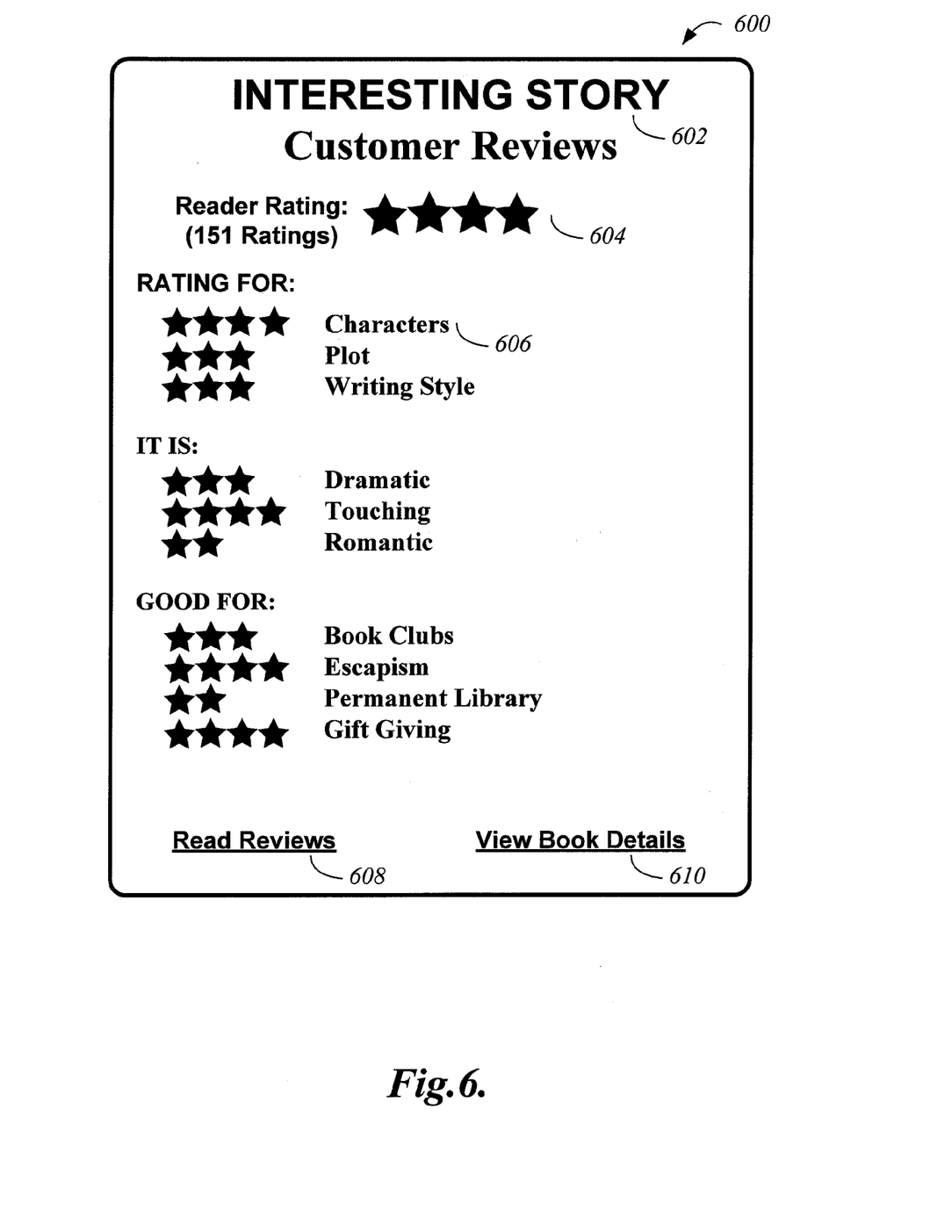
FIG. 6 is an illustrative user interface generated by the content server for displaying reviews of an audio book for which a graphical code associated with the audio book has been captured by the user computing device.

FIG. 6 is an illustrative user interface 600 generated by the content server 110 for displaying reviews or ratings of an audio book or other item for which a graphical code has been captured by the user computing device 102. The rating information may be retrieved by the content server 110, for example, from one or more data stores, such as content data store 114. As indicated by text 602, the customer rating information displayed in user interface 602 relates to the book or audio book titled "Interesting Story." User interface 600 may be generated by the content server 110, for example, in response to the user selecting option 510 in user interface 500 shown in FIG. 5, discussed above. As indicated by rating 604, the audio book 602 has received an average rating of four stars from readers. User interface 600 includes a detailed breakdown of the ratings that the audio book 602 has received for different aspects or qualities of the audio book. For example, as indicated by character rating 606, readers rated the characters of the audio book an average of four stars. The user may select text 608, "Read Reviews," in order to read more detailed reviews of the audio book 602, which may include narrative review text beyond the summary rating information illustrated in user interface 600. The user may select "View Book Details" text 610 in order to view additional information associated with audio book 602, such as a summary of the book, samples of the audio book, information regarding other formats of the audio book item or related items (such as an electronic book, paperback book, hard cover book, an alternate recording of the same book with a different narrator, or a movie). In some embodiments, the content server 110 may send content to the user computing device 102 that is associated with a related electronic book (such as a portion of text content of the electronic book), a movie (such as a portion of video content), and/or another related item.

Figure 7:
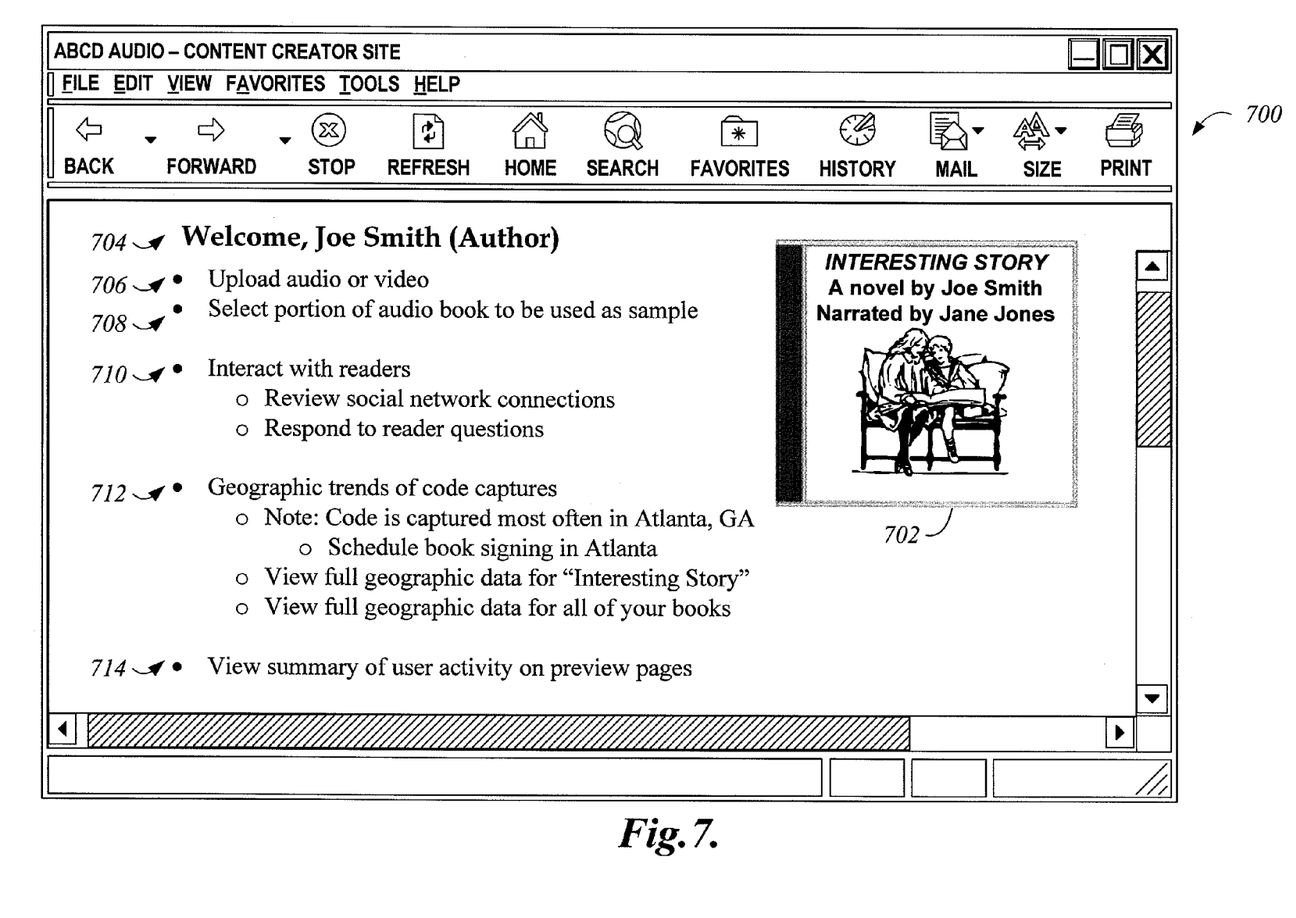
FIG. 7 is an illustrative user interface generated by the content server for enabling a content creator to send preview content associated with an audio book or other item to the content server, and/or view user activity data associated with an audio book or other item.

FIG. 7 is an illustrative user interface 700 generated by the content server 110 for enabling a content creator to send preview content to the content server, and/or view user activity data associated with an audio book or other item. As discussed above, the content creator may be, for example, any individual or entity involved in creation of an item (for example, an audio book or other audio recording), such as an author, publisher, narrator, editor, etc. User interface 700 may be presented for display, for example, on a browser or other program operating on content creator computing device 102. As illustrated by text 704, the user of content creator computing device 104 may be Joe Smith, the author of the audio book item 702, "Interesting Story." The content creator may select "Upload audio or video" option 706 in order to send audio or video content associated with the audio book 702 to the content server 110. The audio or video content may be, for example, audio or video of the author discussing the content of the book on which the audio book is based, how the book relates to other works of the author, the inspiration for the book, etc. In some embodiments, the audio or video that the content creator computing device 104 sends to the content server 110 may then be accessible to or sent to user computing devices that subsequently request information related to the audio book by capturing a graphical code associated with the audio book. For example, such audio or video may be accessible to a user via selection of a user interface option such as "Play Author Interview" option 508 in user interface 500, discussed above.

User interface 700 also includes an option 708 that the content creator may select in order to select a portion of the audio book 702 to be used as an audio sample. For example, selection of option 708 may present the content creator with one or more user interfaces generated by the content server 110 that enable the content creator to listen to portions of the audio book 702 and select one or more portions that the content creator would like for a user to be presented with when the user requests a URI associated with a graphical code placed on the audio book. In some embodiments, the content creator may select an initial audio sample, such as the first chapter of the audio book, as well as an additional sample (such as the second chapter) that the content server 110 may provide to a user a predetermined amount of time after the user initially requests an audio preview or audio sample of the audio book 702. For example, the content creator may select that the content server 110 should provide a user with the additional audio data a day after the user captures the graphical code, provided that the content server 110 does not determine that the user has already purchased or otherwise obtained the audio book 702 prior to the predetermined time.

Illustrative user interface 700 includes options 710 that enable the content creator to interact with readers. For example, the content server 110 may enable the content creator to review social networking activity of readers or users that have captured a graphical code of audio book 702. Such interaction may include responding to requests from users to create social network connections with the content creator on a social networking service, responding to questions or other messages from users, etc.

Also included in illustrative user interface 700 are options 712, which may be selected by the content creator in order to view geographic trends of captures of the graphical code associated with audio book 702. The geographic trend data may be determined by the content server 110, for example, based on location information received from user computing devices at the time of code capture by the user computing devices, and stored in one or more data stores, such as content data store 114. For example, options 712 note that the graphical code associated with audio book 702 has been captured most often in Atlanta, and accordingly includes an option for the content creator to schedule a book signing in Atlanta. In some embodiments, a popular capture location may be presented to the content creator that indicates that a certain location has a higher than expected capture rate for the graphical code placed on audio book item 702 relative to the population of the location and/or the number of captures of graphical codes for other items at the location.

Options 712 also enable the content creator to view full geographic data for graphical code captures related to audio book 702, and/or other books or items associated with the content creator. For example, the content server 110 may generate summary or trend information related to the locations that the graphical code placed on audio book 702 and/or one or more additional items' graphical codes have been captured by users. The generated information presented for display to the content creator may include recent trends in code captures, such as stores, cities, states, regions, or countries from which user computing devices have recently sent a relatively large number of requests for a URI of an associated graphical code. The generated geographic summary information may additionally or alternatively include a summary of various time periods (such as the last day, week, month or year) and the number of URI requests received from various locations (which may be grouped by retailer, city, state, region, and/or country).

Illustrative user interface 714 also includes selectable text 714 that enables the content creator to view a summary of user activity associated with users that have requested a URI associated with a graphical code placed on audio book item 702. For example, in some embodiments, the content server 110 may store information regarding each user's browsing activity or user interface request history once the user has requested the initial URI associated with a graphical code. Option 714 may enable the content creator to view, for example, the number or percentage of users that have listened to the sample audio data, the number of those users that listened to the entire sample audio data (which may indicate, for example, that the given users liked the sample audio data), the number of users that listened to only a small portion of the sample audio data (which may indicate, for example, that the given users did not like the sample audio data), the number of subsequent user interfaces requested by users (such as user interfaces for viewing customer review information, adding the item to a wish list, etc.), and/or whether the user subsequently purchased the item from the content server 110, a retailer, or another entity that provides information to the content server 110 or makes sale information accessible to the content server 110.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   an electronic data store configured to at least store audio content associated with an audio book; and
   a computing system comprising one or more hardware computing devices, said computing system in communication with the electronic data store and configured to at least:
      receive, from a computing device, an indication of a portion of audio content, from among a plurality of portions of audio content of the audio book, that should be used as a preview portion, wherein the indication is received based on a selection, made within a user interface, of the portion of audio content;
      based on the indication, store information in the electronic data store that identifies the portion of audio content as the preview portion associated with the audio book;
      following capture, by a mobile computing device other than the computing device, of an image of a graphical code associated with the audio book, and subsequent to receiving the indication from the computing device,
         electronically receive, from the mobile computing device, a request for a uniform resource identifier generated using the graphical code from the image captured by the mobile computing device;
         in response to receiving the request, retrieve from the electronic data store the portion of audio content identified in the electronic data store as the preview portion; and
         send the retrieved preview portion to the mobile computing device for playback by the mobile computing device; and
      enable at least one computing device to access location information that identifies a geographic location where the image of the graphical code associated with the audio book was captured.

2. The system of claim 1, wherein the computing device is a computing device associated with a content creator associated with the audio book, and wherein the selection is made within the user interface by the content creator.

3. The system of claim 2, wherein the content creator is at least one of an author, a narrator, a publisher or an editor.

4. The system of claim 1, wherein the graphical code is included on packaging associated with the audio book.

5. The system of claim 1, wherein the computing system is further configured to receive, from the mobile computing device, information identifying the mobile computing device.

6. The system of claim 1, wherein the computing system is further configured to receive, from the mobile computing device, information identifying a user of the mobile computing device.

7. The system of claim 1, wherein the image of the graphical code is captured by an imaging device associated with the mobile computing device.

8. A computer-implemented method comprising:
   as implemented by one or more computing devices configured with specific executable instructions,
      receiving, from a computing device, a selection of a portion of audio content from an audio book, wherein the selection identifies that the portion of audio content should be used as a preview portion;
      based on the selection, storing information in an electronic data store that identifies the portion of audio content as the preview portion;
      following capture, by a mobile computing device that is different than the computing device, of an image of a code associated with the audio book, and subsequent to receiving the selection from the computing device,
         electronically receiving, from the mobile computing device, a request for a uniform resource identifier generated using the code from the image captured by the mobile computing device;
         in response to receiving the request, retrieving the portion of audio content identified in the electronic data store as the preview portion; and
         sending the retrieved preview portion to the mobile computing device for playback by the mobile computing device; and
      enabling at least one computing device to access location information that identifies a geographic location where the image of the code associated with the audio book was captured.

9. The computer-implemented method of claim 8, wherein the code comprises a two-dimensional graphical code.

10. The computer-implemented method of claim 8, wherein the code comprises a barcode.

11. The computer-implemented method of claim 8, further comprising sending to the mobile computing device information identifying one or more items that are similar to the audio book.

12. The computer-implemented method of claim 11, wherein the one or more items that are similar to the audio book comprise at least one of a second audio book, an electronic book, a video, a paperback book or a hard cover book.

13. The computer-implemented method of claim 8, further comprising sending to the mobile computing device information identifying a second audio book based at least in part on the same content as the audio book and narrated by a different narrator than the audio book.

14. The computer-implemented method of claim 8, further comprising determining a retailer associated with the code.

15. A computer-readable, non-transitory storage medium storing computer executable instructions that, when executed by one or more computer systems, configure the one or more computer systems to perform operations comprising:

receiving, from a computing device, a selection of a portion of audio content from an audio book, wherein the selection identifies that the portion of audio content should be used as a preview portion;

subsequent to receiving the selection from the computing device, electronically receiving, from a mobile computing device that is different than the computing device, a request for a uniform resource identifier generated by the mobile computing device based at least in part on an image of a code captured by the mobile computing device, wherein the code is associated with the audio book;

in response to receiving the request from the mobile computing device, retrieving the portion of audio content selected to be used as a preview portion;

sending the retrieved preview portion to the mobile computing device; and enabling at least one computing device to access location information that identifies a geographic location where the image of the code associated with the audio book was captured.

16. The computer-readable, non-transitory storage medium of claim 15, wherein the code is captured by the mobile computing device in an image that includes packaging of the audio book.

17. The computer-readable, non-transitory storage medium of claim 15, wherein the at least one computing device is associated with at least one of an author, a narrator, a publisher or an editor associated with the audio book.

18. The system of claim 1, wherein the at least one computing device that is enabled to access the location information includes the computing device.

19. The system of claim 1, wherein the at least one computing device is different than the computing device.

\* \* \* \* \*